(12) United States Patent
Slatter et al.

(10) Patent No.: US 7,306,193 B2
(45) Date of Patent: Dec. 11, 2007

(54) CLAMP-ON MULTI-PURPOSE SUPPORT PLATE

(76) Inventors: Stephen Slatter, 8631 NW. 21st Ct., Sunrise, FL (US) 33322; William Kushner, 98 NE. 179th St., Miami, FL (US) 33162; Jon Kushner, 98 NE. 179th St., Miami, FL (US) 33162

( * ) Notice: Subject to any disclaimer, the term of this patent is extended or adjusted under 35 U.S.C. 154(b) by 118 days.

(21) Appl. No.: 11/171,883

(22) Filed: Jun. 30, 2005

(65) Prior Publication Data

US 2005/0236539 A1 Oct. 27, 2005

Related U.S. Application Data

(62) Division of application No. 10/852,053, filed on May 24, 2004, now Pat. No. 7,007,911.

(60) Provisional application No. 60/473,303, filed on May 23, 2003.

(51) Int. Cl.
*A01K 97/10* (2006.01)

(52) U.S. Cl. ..................... 248/538; 248/230.1; 43/21.2

(58) Field of Classification Search ................ 248/214, 248/205.1, 538, 539, 534, 231.8, 230.1, 229.12, 248/229.13, 229.22, 229.23, 229.2, 230.3; 43/21.2; 114/255, 364
See application file for complete search history.

(56) References Cited

U.S. PATENT DOCUMENTS

| 1,257,073 | A | * | 2/1918 | Frank .......................... 114/364 |
| 2,657,442 | A | * | 11/1953 | Bedford, Jr. ................ 248/74.2 |
| 3,047,263 | A | * | 7/1962 | Mittenzwei ................... 248/72 |
| 4,283,152 | A | | 8/1981 | Smith et al. |
| 5,148,981 | A | * | 9/1992 | Lynch et al. ................. 238/351 |
| 5,662,255 | A | * | 9/1997 | Lu .............................. 224/451 |
| 5,673,507 | A | * | 10/1997 | Stokes, Jr. .................... 43/21.2 |
| 6,186,383 | B1 | * | 2/2001 | Kobdish ...................... 224/420 |
| 6,851,654 | B2 | * | 2/2005 | Slatter ......................... 248/314 |
| 2004/0000623 | A1 | * | 1/2004 | Slatter ......................... 248/534 |
| 2004/0035350 | A1 | * | 2/2004 | Rupp, II ...................... 114/364 |
| 2004/0238714 | A1 | * | 12/2004 | Slatter et al. ................ 248/534 |
| 2005/0045785 | A1 | * | 3/2005 | Cohen .......................... 248/214 |

* cited by examiner

*Primary Examiner*—Ramon O Ramirez
(74) *Attorney, Agent, or Firm*—Robert M. Schwartz; Alfred K. Dassler

(57) ABSTRACT

A mounting plate assembly for mounting accessories on a structure of a boat. The assembly includes a plate having a first clamping end and a second clamping end and two clamping units each having a respective first member and a respective second member for clamping to the plate. One of the clamping units clamps the first clamping end of the plate and the other of the clamping units clamping the second clamping end.

13 Claims, 5 Drawing Sheets

41b

41a

CLAMP-ON MULTI-PURPOSE SUPPORT PLATE

CROSS-REFERENCE TO RELATED APPLICATIONS

This is a divisional application of application Ser. No. 10/852,053, filed May 24, 2004, now U.S. Pat. No. 7,007,911; the application also claims the benefit of U.S. Provisional Application Ser. No. 60/473,303, filed on May 23, 2003, entitled CLAMP-ON MULTI-PURPOSE SUPPORT PLATE; the prior applications are herewith incorporated by reference in their entirety.

TECHNICAL FIELD OF THE INVENTION

This invention relates to the field of sport fishing, and particularly to an outrigger mounting system having a multi-purpose support plate capable of withstanding high forces and permitting rotational movement of an outrigger.

BACKGROUND OF THE INVENTION

Saltwater sport fishing typically consists of anglers positioned on boats that are then dispatched to prolific offshore fishing areas. One useful method of catching game fish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a game fish, the wake of a vessel generally creates the appearance of a large school of smaller fish to be preyed upon. The angler can strategically simulate bands of straggling or displaced fish from the school with numerous baited lines. These simulated straggling fish are misinterpreted by the game fish to be the disadvantaged and weakened fish that game fish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting such outriggers into place (see e.g. U.S. Pat. Nos. 6,213,441 and 5,685,107), with each having distinct drawbacks. Such drawbacks include overall mechanical complexity powered operation; non-durable construction; and/or ineffective position adjustment and locking mechanisms that slip and/or wear out.

Outrigger poles often extend outwardly from the boat to a significant distance while in their fishing position. Due to the forces applied to the mount by a combination of the weight of the outrigger assembly with the outrigger, the rotational movement of the boat, the wind force and the forces associated with trolling, an extremely sturdy structure is essential in order to provide suitable performance over a period. Various outrigger mounts currently supply bracing struts and rods to provide the requisite strength. These structures can be cumbersome in operation, particularly when it becomes necessary to reposition the outrigger.

A number of outrigger mounts employ telescoping or sliding joints that are particularly susceptible to corrosion and sticking, particularly in conjunction with salt-water fishing. Furthermore, outrigger mounts of the prior art often require an array of independent attachments to the boat structure in specific relation to each other, thus necessitating skilled and protracted installation, as well as additional structural reinforcement to the boat.

In addition, the prior art outrigger mounts present extended sleeve sockets for the slid able receipt of the proximal ends of the outriggers. Due to the degree of support required for the outrigger, a secure fit between the proximal end and the sleeve socket is essential. Thus, the outriggers are frequently extremely difficult to remove from the sockets after a prolonged period of usage, particularly in salt water, and often call for dismounting at least a portion of the outrigger mount.

The prior art presents a variety of approaches that have been engaged to suspend an outrigger in place while trolling for fish. Notwithstanding these efforts to provide suitable outrigger mounts, the existing prior art devices are limited in numerous respects. Accordingly, What is lacking that the prior art has not provided is a simple multi-purpose support plate for a boating accessory assembly, such as an outrigger assembly, that is capable of withstanding high forces while permitting rotational movement of an outrigger without using bracing struts and rods or sleeve sockets.

SUMMARY OF THE INVENTION

The present invention eliminates the above-mentioned needs for a support plate by providing a clamp-on multi-purpose support plate for a boating accessory assembly that is capable of withstanding high forces while permitting rotational movement.

With the foregoing and other objects in view there is provided, in accordance with the invention a mounting plate assembly for mounting accessories on a structure of a boat. The assembly including a plate having a first clamping end and a second clamping end, two clamping units each having a respective first member and a respective second member for clamping to the plate. One of the clamping units clamps the first clamping end of the plate and the other of the clamping units clamps the second clamping end.

In accordance with another feature of the invention, the clamping units are the same. The first member has a first member clamping arm and the second member has a second member clamping arm. The clamping ends of the plate are disposed between the first member clamping arm the second member clamping arm.

In accordance with a further feature of the invention, the first member has a first clamping surface and the second member has a second clamping surface. The first clamping surface and the second clamping surface contact the boat structure for mounting the plate.

In accordance with an added feature of the invention, the first member has a first clamping engagement arm and the second member has a second clamping engagement arm. The first and second engagement arms oppose one another for holding the first and second members together in a mounted position of the clamping unit on the boat structure.

In accordance with an additional feature of the invention the assembly includes a disposed at the first clamping surface and at the second clamping surface, the reducer sleeve mounts the plate on a boat structure of a smaller diameter.

With the objects of the invention in view, there is also provided a mounting plate assembly for mounting accessories on a tubing structure of a boat. The assembly including a multi-purpose support plate having clamping regions and at least one hole formed therein. An accessory clamp assembly having a first reducer accommodating the tubing and the accessory clamp assembly having clamping arms for clamping one of the clamping regions of the plate therebetween.

In accordance with yet another feature of the invention the accessory clamp assembly is two accessory clamp assemblies, each clamping different ones of the clamping regions.

With the objects of the invention in view, there is also provided a mounting plate assembly for mounting accessories on a tubing structure. The assembly includes a support plate having clamping regions disposed at opposite ends of the support plate. The mounting plate assembly includes clamp assembly having a first clamp portion and a second clamp portion. The first clamp portion and the second clamp portion clamping a tube of the support tube structure and one of the clamping regions therebetween.

In accordance with yet a further feature of the invention, two of the clamp assemblies are provided. Each of the clamping regions have a respective one of the clamping assemblies.

In accordance with yet an added feature of the invention, the clamp assemblies each include a respective reducer insert disposed between the first clamp portion and the second clamp portion for accommodating a tube of the support tube structure that is of a smaller size.

In accordance with yet an additional feature of the invention, the first clamping portion and the second clamping portion each have a respective planar surface for clamping the clamping assemblies onto respective ones of the clamping regions.

In accordance with still another feature of the invention, the first clamping portion and the second clamping portion each have a respective c-shaped clamping surface for clamping the clamping assemblies onto respective tubes of the tube structure.

In accordance with still a further feature of the invention, the first clamping portion and the second clamping portion are connected with screws.

In accordance with another mode of the invention, the mounting plate assembly includes a reducer insert that is attached to the c-shaped clamping surfaces for accommodating a tube of the support structure that is of a smaller size.

In accordance with a further mode of the invention, the first clamping portion and the second clamping portion each have a respective engagement arm connecting the first clamping portion and the second clamping portion in a clamshell engagement.

In accordance with an additional mode of the invention, one of the planar surfaces has a step for locating the clamp assemblies against the plate.

Other features which are considered as characteristic for the invention are set forth in the appended claims.

Although the invention is illustrated and described herein as embodied in a sport fishing multi-purpose support plate assembly that is capable of both withstanding high forces and permitting rotational movement of boating accessories, as well as being releasably engaged to a boating structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGS.

DETAILED DESCRIPTION OF THE INVENTION

Figure 1:
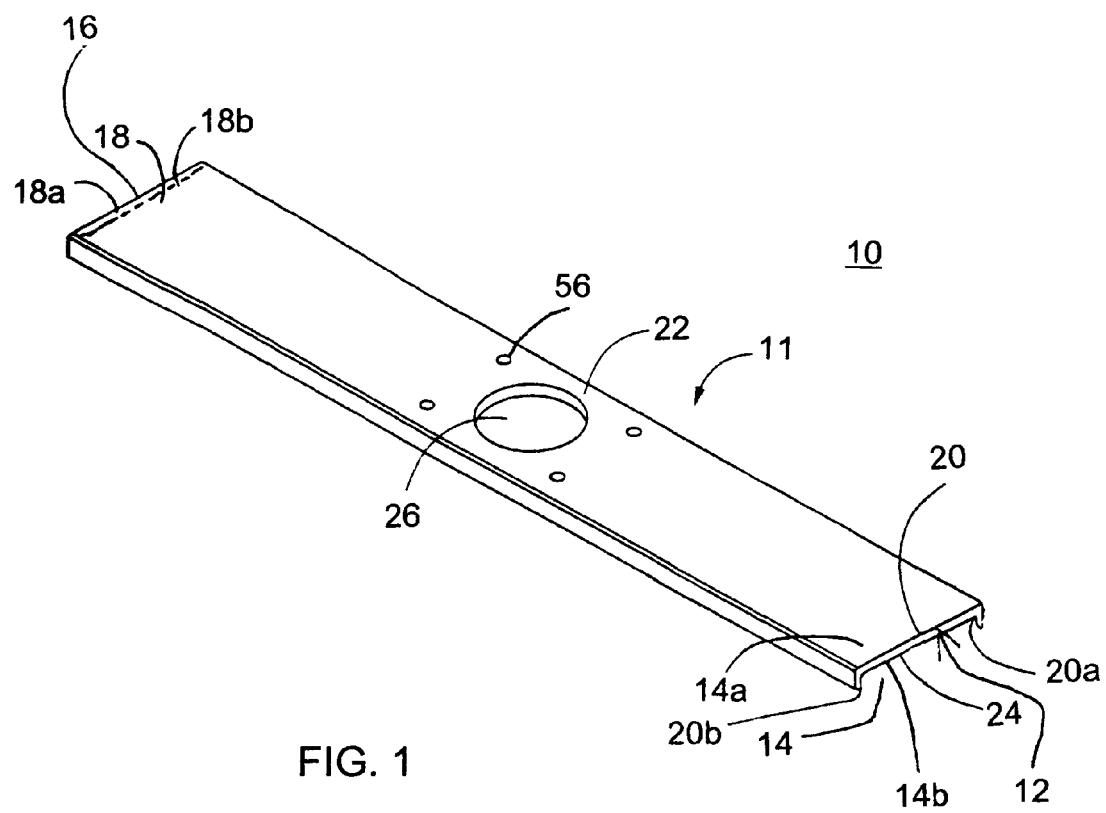
FIG. 1 is an isometric top view of the clamp-on multi-purpose support plate of the preferred embodiment of the present invention.

Referring now to FIG. 1, a portion of the multi-purpose support plate assembly 10 is illustrated as multi-purpose support plate 11. Multi-purpose support plate 11 includes a first mounting end portion 12, a second mounting end portion 16, and a center portion 20.

First mounting end portion 12 includes a first clamping region 14 for attachment to an accessory clamp, such as accessory clamp 27 of FIG. 2 (detailed below). First clamping region 14 is preferably formed from first mounting end portion 12. First clamping region 14 further includes first surface 14a and opposing second surface 14b. First and second surfaces 14a and 14b provide engagement surfaces for the accessory clamp, such as accessory clamp 27 of FIG. 2.

As with first mounting end portion 12, second mounting end portion 16 includes a second clamping region 18 for additional attachment to another accessory clamp, such as accessory clamp 27 of FIG. 2 (discussed below). Second clamping region 18 is preferably formed from second mounting end portion 16. Second clamping region 18 further includes first surface 18a and opposing second surface 18b. First and second surfaces 18a and 18b provide engagement surfaces for the accessory clamp, such as accessory clamp 27 of FIG. 2.

Between first mounting end portion 12 and second mounting end portion 16 is center portion 20. Center portion 20 includes a top layer 22, a bottom layer 24, and preferably a central bore 26. Central bore 26 passes through both the top layer 22 and the bottom layer 24. The benefit of central bore 26 in general is that it is pre-drilled and used to accommodate a boating accessory, such as an outrigger assembly, a light, or the like, that requires passage through multipurpose support plate 11. If the accessory does not require passage there through, then central bore 26 is not required.

Specifically, central bore 26 permits a portion of the boating accessory assembly, such a handle, to pass through central bore 26 of multi-purpose support plate 11. In doing so, central bore 26 further allows for a boating accessory assembly to be engaged in rotational movement within multi-purpose support plate 11. This is particularly useful for boating accessories, such as outriggers, that function better when they are less restricted in movement.

Figure 2:
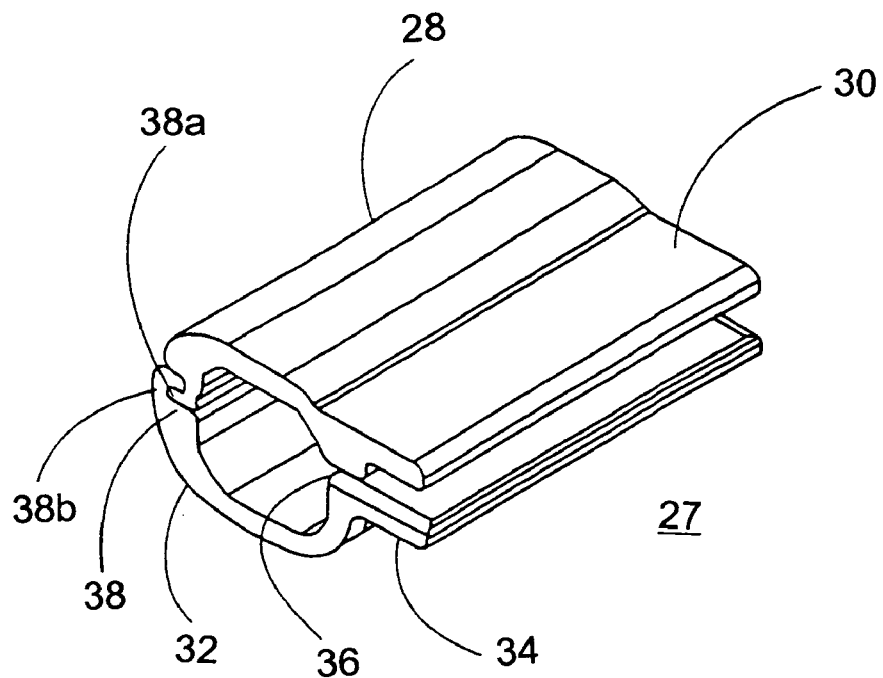
FIG. 2 is an isometric top view of the accessory clamp of the preferred embodiment of the present invention.
Figure 3:
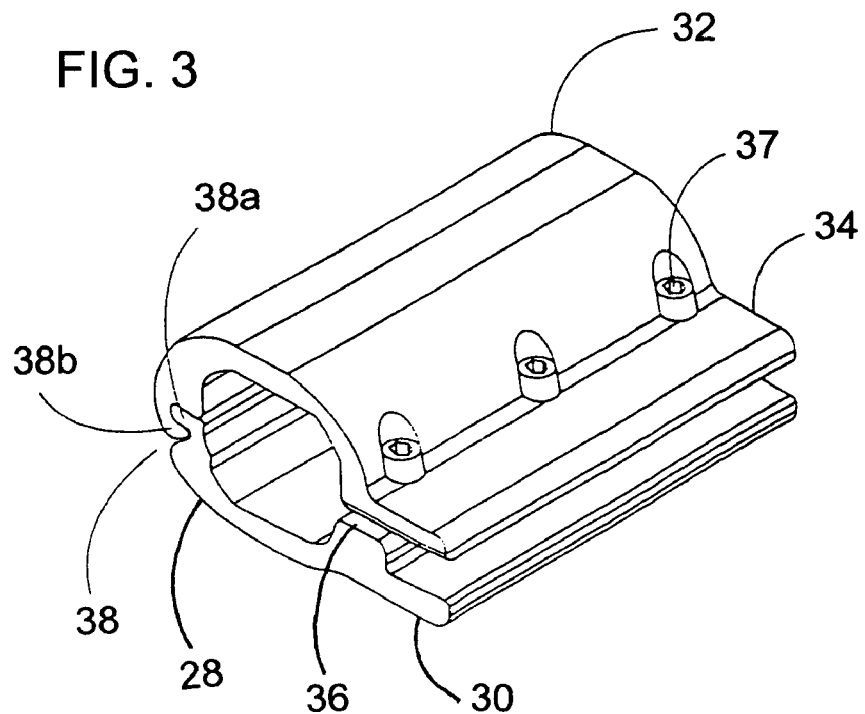
FIG. 3 is an isometric bottom view of the accessory clamp of FIG. 2.

Referring now to FIGS. 2 and 3, accessory clamp assembly 27 of the preferred embodiment of the present invention is illustrated. Accessory clamp assembly 27 includes an upper clamping member 28 having an upper arm 30 for operatively engaging first surface 14a of first clamping region 14. Similarly accessory clamp assembly 27 further includes a lower clamping member 32 having a lower arm 34 for operatively engaging second surface 14b of first clamping region 14. A first attachment region 36 is provided for affixing upper clamping member 28 to lower clamping member 32. An array of materials and methods that are known to those skilled in the art can be employed to use first attachment region 36 to secure upper clamping member 28 to lower clamping member 32, such as fasteners 37.

Figure 4:
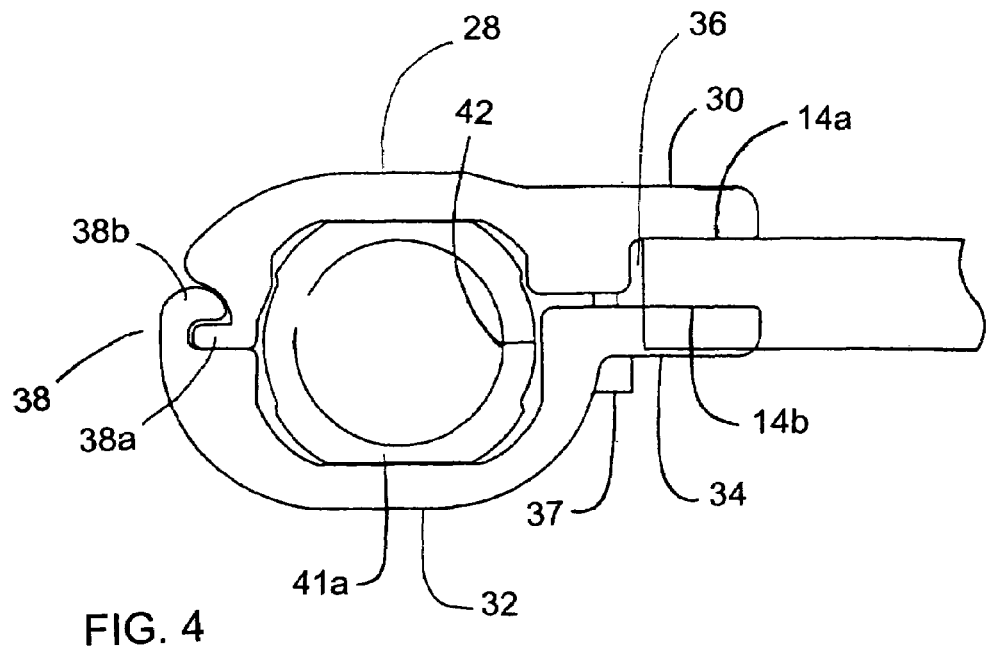
FIG. 4 is a sectional view illustration of the accessory clamp of FIG. 2 with an insert.

As shown FIG. 4, fasteners 37 preferably adjustable so as to permit a tightening of the frictional fit between upper arm 30, first surface 14a of first clamping region 14, lower arm 34, and second surface 14b of first clamping region 14.

Referring back to FIGS. 2 and 3, as well as FIG. 4, a second attachment region 38 for affixing upper clamping member 28 to lower clamping member 32 is further provided. As is illustrated in FIGS. 2, 3, and 4, second attachment region 38 incorporates first engagement arm 38a and second engagement arm 38b. First engagement arm 38a is formed as a portion of upper clamping member 28 and is positioned opposite upper clamping member 28 and is positioned opposite lower arm 34 with respect to lower clamping member 32.

Figure 5:
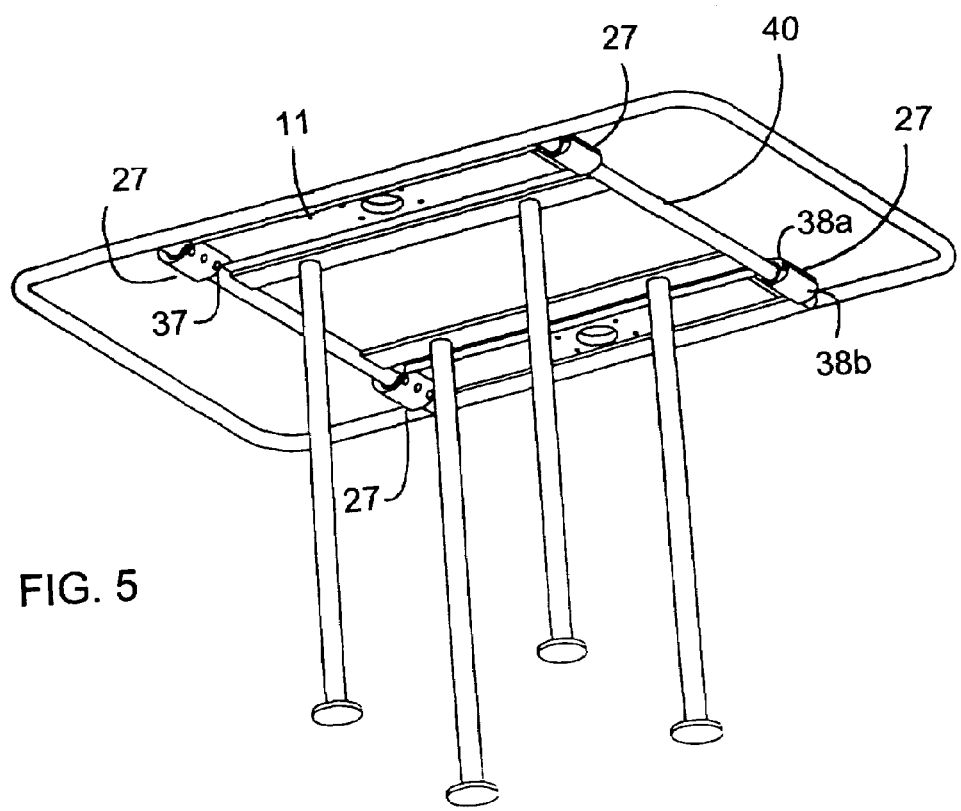
FIG. 5 is an isometric view of the clamp-on multi-purpose support plate inoperative engagement with the accessory clamp in accordance with preferred embodiment of the present invention on a T-top.

Preferably, first engagement arm 38a and second engagement arm 38b are arranged in a slidable engagement, or, alternatively in a clamshell opening engagement. The slidable engagement permits the user to position accessory clamp assembly 27 and attachment substrate, such as a portion of metal tubing on a boat, with relative ease by positioning upper clamping member 28 over the attachment substrate then sliding lower clamping member 32 into position so that first engagement arm 38a and second engagement arm 38b are placed in a slidable engagement. Once the slidable engagement between first engagement arm 38a and second engagement arm 38b is completed, fasteners 37 are preferably positioned so as to frictionally secure accessory clamp assembly 27 to the attachment substrate. Likewise, by using a clam shell-like engagement upper clamping member 28 and lower clamping member 32 can operate as a hinge, with first engagement arm 38a a second engagement arm 38b in a hinging engagement. The hinging engagement permits upper clamping member 28 and lower clamping member 32 to wrap around a portion of metal tubing on a boat. However, unlike a traditional hinge, the hinging engagement between upper clamping member 28 and lower clamping member 32 is not susceptible to the wear or deterioration from exposure to the elements. Referring now to FIG. 5, the preferred embodiment of the present invention is shown in operation. As illustrated in FIG. 5, accessory clamps assembly 27 is demonstrated frictionally secured to attachment substrate 40. Preferably, accessory clamps 27 are engaged in pairs multipurpose support 11. As detailed above, attachment substrate 40 is preferably a portion of a boat, such as tubing, that is common for use as a support structure. FIG. 5 illustrates that first engagement arm 38a and second engagement arm 38b are arranged in an engagement with respect to one another around attachment substrate 40. In order to facilitate a good fit and reduce the amount of slip along attachment substrate 40, fasteners 37 (shown in FIGS. 3 and 4) are tightened.

Figure 6:
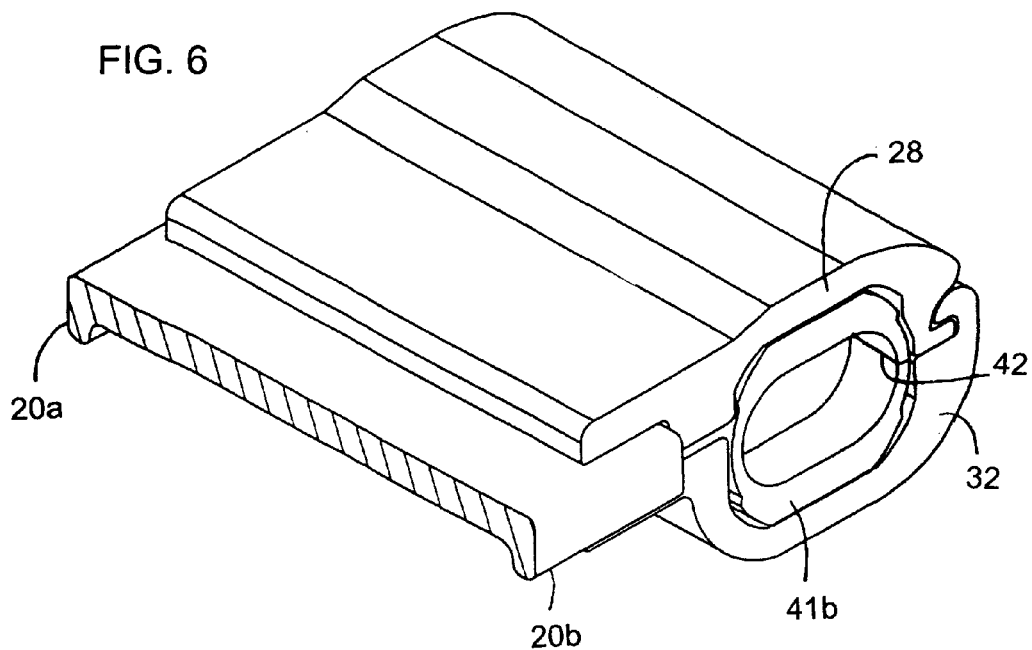
FIG. 6 is an isometric view of the mating relationship of clamp and support plate on attached to a pipe.
Figure 7:
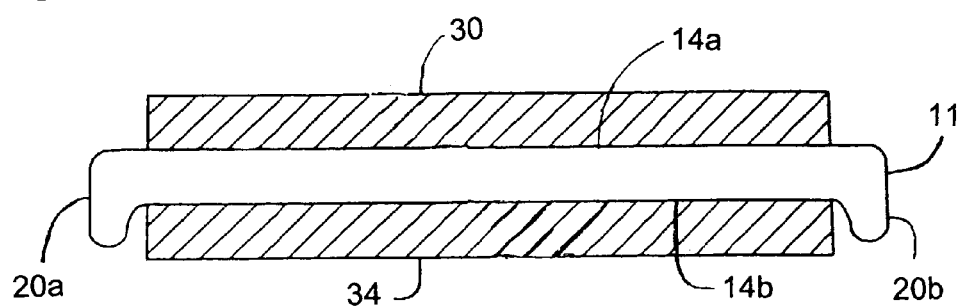
FIG. 7 is a front view of the mating relationship of FIG. 6.
Figure 8:
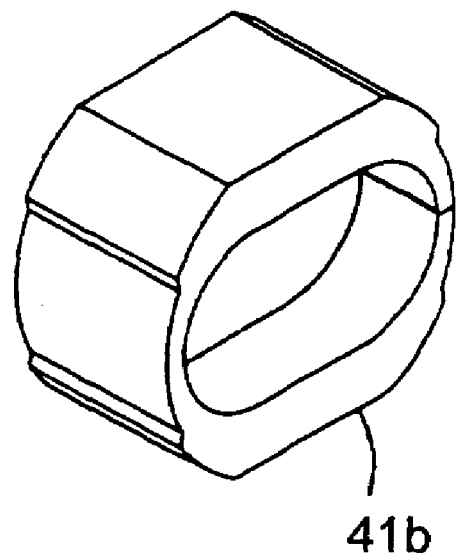
FIG. 8 is a side view of reducer for a large tube.
Figure 9:
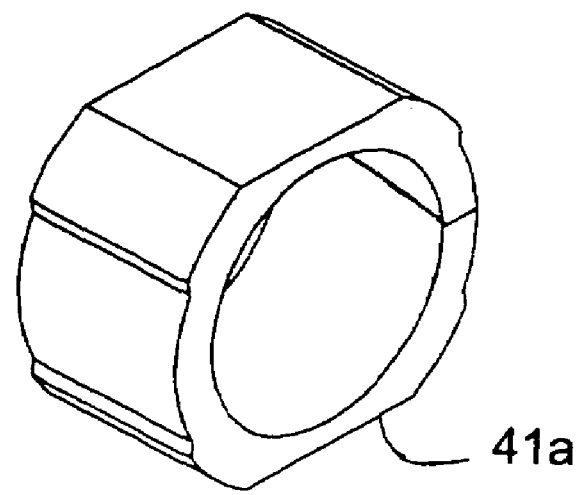
FIG. 9 is a side view of reducer for a small tube.

Tightening fasteners 38 also reduces the distance between upper arm 30 and lower arm 34 so as cause upper arm 30 to operatively engage first surface 14a of first clamping region 14 and lower arm 34 to operatively engage second surface 14b of first clamping region 14. The resulting operative engagement between upper arm 30, first surface 14a, lower arm 34, and second surface 14b results in a friction fit between multi-purpose support plate 11 and accessory clamp assembly 27 (as shown in FIG. 7). This resulting combination eliminates the need for welding or otherwise permanently affixing multi-purse support plate 11 to attachment substrate 40, thereby permitting multipurpose support plates to be moved to and from various locations on a boat. Additionally, as illustrated in FIGS. 6 and 7, lips 20a and 20b prevent multi-purpose support plate 11 from shifting side to side when secured between upper arm 30 and lower arm 34 of accessory clamp assembly 27. Referring now to FIG. 4 and accessory clamp assembly 27 is illustrated engaging a reducer, reducer 41a in FIGS. 4 and 8 and reducer 41b in FIGS. 6 and 7. Reducers 41a and 41b are employed so that clamp assembly 27 can engage a variety of tubings having differing circumferences, including tubing having substantially circular circumferences. Reducer 41a of FIGS. 4 and 8, for example, can be utilized so that accessory clamp assembly 27 can engage tubing of a first diameter, thereby permitting accessory clamp assembly 27 to be used in connection with tubing that would otherwise allow accessory clamp assembly 27 to slide thereon. Similarly, reducer 41b permits accessory clamp assembly 27 to engage tubing of a second, smaller diameter than reducer 41b. Reducers 41a and 41b are preferably constructed form resilient flexible material that is bendable and yet capable of retaining its shape. Additionally, reducers 41a and 41b function as insulators, and prevent abrasion between accessory clamp assembly 27 and the tubing. Preferably, the material forming reducers 41a and 41b has a shore A durometer ranging from about 40 to about 120, with a preferred range of about 50 to about 75. Additionally, reducers 41a and 41b incorporate a cut line 42, thereby permitting reducers 41a and 41b to be stretched around the tubing, such as tubing 40 of FIG. 5. Providing the user with a variety of reducers, such as reducers 41a and 41b, in one package allows for a significant reduction in the number of stockkeeping units (often referred to as "SKUs"). Thus, a retailer is not required to keep track of more SKUs than is necessary.

Although only a few exemplary embodiments of the present invention have been described in detail above and in the following Figures, those skilled in the art will readily appreciate that numerous modifications to the exemplary embodiments are possible without materially departing from the novel teaching and advantages of this invention. Accordingly, all such modifications are intended to be included within the scope of this invention as defined in the following claims.

We claim:

1. A mounting plate assembly for mounting accessories on a structure of a boat, the assembly comprising:
   a plate having a first clamping end and a second clamping end;
   two clamping units each having a respective first member and a respective second member for clamping to said plate, one of said clamping units clamping said first clamping end of said plate and the other of said clamping units clamping said second clamping end;
   said clamping units being the same, said first member having a first member clamping arm and said second member having a second member clamping arm, said clamping ends of said plate being disposed between said first member clamping arm said second member clamping arm;
   said first member having a first clamping surface and said second member having a second clamping surface, said first clamping surface and said second clamping surface contacting the boat structure for mounting said plate.

2. The assembly according to claim 1, wherein:
   said first member has a first clamping engagement arm and said second member has a second clamping engagement arm, said first and second engagement arms oppose one another for holding said first and second members together in a mounted position of the clamping unit on the boat structure.

3. The assembly according to claim 2 further comprising a reducer sleeve disposed along said first clamping surface and said second clamping surface for mounting the plate on a boat structure of a smaller diameter.

4. A mounting plate assembly for mounting accessories on a tubing structure of a boat, the assembly comprising:
   a multi-purpose support plate having clamping regions and at least one hole formed therein;
   an accessory clamp assembly having a first reducer accommodating the tubing and said accessory clamp assembly having clamping arms for clamping one of said clamping regions of said plate therebetween.

5. The mounting plate assembly according to claim 4, wherein said accessory clamp assembly is two accessory clamp assemblies, each clamping different ones of said clamping regions.

6. A mounting plate assembly for mounting accessories on a tubing structure, the assembly comprising:
   a support plate having clamping regions disposed at opposite longitudinal ends of said support plate;
   a clamp assembly having:
      a first clamp portion; and
      a second clamp portion, said first clamp portion and said second clamp portion clamping a tube of the support tube structure and one of said clamping regions therebetween wherein two of said clamp assemblies are provided, each of said clamping regions having a respective one of said clamping assemblies.

7. The assembly according to claim 6, wherein said clamp assemblies each include a respective reducer insert disposed between said first clamp portion and said second clamp portion for accommodating a tube of the support tube structure that is of a smaller size.

8. The assembly according to claim 6, wherein said first clamping portion and said second clamping portion each have a respective planar surface for clamping said clamping assemblies onto respective ones of said clamping regions.

9. The assembly according to claim 8, wherein said first clamping portion and said second clamping portion each have a respective c-shaped clamping surface for clamping said clamping assemblies onto respective tubes of the tube structure.

10. The assembly according to claim 9, wherein said first clamping portion and said second clamping portion are connected with screws.

11. The assembly according to claim 10, wherein said first clamping portion and said second clamping portion each have a respective engagement arm connecting said first clamping portion and said second clamping portion in a clamshell engagement.

12. The assembly according to claim 9, further comprising a reducer insert being attached to said c-shaped clamping surfaces for accommodating a tube of the support structure that is of a smaller size.

13. The assembly according to claim 8, wherein one of said planar surfaces has a step for locating said clamp assemblies against said plate.

* * * * *